(12) United States Patent
Kojima (10) Patent No.: US 7,899,605 B2
(45) Date of Patent: Mar. 1, 2011

(54) CONTROL DEVICE FOR INTERNAL COMBUSTION ENGINE

(75) Inventor: Kazuo Kojima, Nagoya (JP)

(73) Assignee: Denso Corporation, Kariya (JP)

( * ) Notice: Subject to any disclaimer, the term of this patent is extended or adjusted under 35 U.S.C. 154(b) by 474 days.

(21) Appl. No.: 12/128,965

(22) Filed: May 29, 2008

(65) Prior Publication Data
US 2008/0300770 A1 Dec. 4, 2008

(30) Foreign Application Priority Data
May 31, 2007 (JP) ............................. 2007-144843

(51) Int. Cl.
*G06F 19/00* (2006.01)
*F02D 41/14* (2006.01)

(52) U.S. Cl. ................... 701/109; 701/103; 701/104; 123/674; 123/443

(58) Field of Classification Search ................ 123/399, 123/403, 443, 673–675, 679, 694; 701/101–105, 701/108, 109, 114, 115; 60/274, 276, 285
See application file for complete search history.

(56) References Cited

U.S. PATENT DOCUMENTS

| | | | | |
|---|---|---|---|---|
| 4,985,837 A | * | 1/1991 | Togai et al. ................... | 701/85 |
| 5,755,205 A | * | 5/1998 | Nishimura et al. ...... | 123/406.24 |
| 5,765,533 A | * | 6/1998 | Nakajima ................... | 123/492 |
| 5,785,036 A | * | 7/1998 | Ninomiya et al. ........... | 123/673 |
| 6,244,046 B1 | | 6/2001 | Yamashita | |
| 6,520,167 B1 | * | 2/2003 | Kanno ........................ | 123/674 |
| 6,990,402 B2 | * | 1/2006 | Yasui et al. ................. | 123/674 |
| 7,062,910 B2 | * | 6/2006 | Inoue ........................ | 60/605.2 |
| 7,270,119 B2 | * | 9/2007 | Mitsutani .................... | 123/674 |
| 7,596,941 B2 | * | 10/2009 | Takubo ........................ | 60/285 |
| 7,779,619 B2 | * | 8/2010 | Takubo ........................ | 60/285 |
| 2008/0010977 A1 | | 1/2008 | Kojima et al. | |

FOREIGN PATENT DOCUMENTS

| | | |
|---|---|---|
| JP | H06-108824 | 4/1994 |
| JP | 2000-034946 | 2/2000 |
| JP | 2006-336518 | 12/2006 |
| JP | 2008-019790 | 1/2008 |
| JP | 2008-088838 | 4/2008 |

OTHER PUBLICATIONS

U.S. Appl. No. 11/902,870 to Morimoto et al., filed Sep. 26, 2007, corresponding to JP 2008-088838).

* cited by examiner

*Primary Examiner*—Willis R Wolfe, Jr.
(74) *Attorney, Agent, or Firm*—Nixon & Vanderhye PC (57) ABSTRACT

During lean combustion, an ECU as a control device for a diesel engine calculates a ratio between a target A/F value and a detected A/F value detected by a A/F sensor, wherein the target A/F value is a ratio between a target air volume and a target injection amount in order to obtain a request torque. The ECU calculates the air volume after compensation during rich combustion by multiplying the target air volume with the compensation gain value. The ECU instructs an air intake throttle valve and an EGR valve to regulate those opening degrees according to the calculation result in order to decrease a torque difference between the lean combustion and the rich combustion.

13 Claims, 6 Drawing Sheets

CONTROL DEVICE FOR INTERNAL COMBUSTION ENGINE

CROSS-REFERENCE TO RELATED APPLICATION

This application is related to and claims priority from Japanese Patent Application No. 2007-144843 filed on May 31, 2007, the contents of which are hereby incorporated by reference.

BACKGROUND OF THE INVENTION

1. Field of the Invention

The present invention relates to a control device for an internal combustion engine such as a diesel engine, in particular, relating to a control device capable of decreasing a torque difference between lean combustion and rich combustion in an internal combustion engine in order to carry out catalyst control.

2. Description of the Related Art

There is a related-art technique to switch lean combustion and rich combustion of an internal combustion engine in order to supply reducing agent to NOx (Nitrogen Oxide) occuluding and reducing catalyst. The lean combustion provides an excess amount of air rather than that of a stoichiometric air-fuel ratio. The rich combustion provides an excess amount of fuel rather than that of the stoichiometric air-fuel ratio. Such a NOx (Nitrogen Oxide) occluding and reducing catalyst absorbs NOx during the lean combustion, and on the other hand, NOx is reduced and Nitrogen is generated during the rich combustion.

In order to solve world wide environmental issues, the demand to purify exhaust gas emitted from motor vehicles has grown stronger. This demand can also be applied to the NOx purifying technology field and its rapid solution is required.

There are cases where three-way catalyst systems are not used in diesel engines, for example, the NOx (Nitrogen Oxide) occluding and reducing catalyst. This is because using the NOx (Nitrogen Oxide) occluding and reducing catalyst is one of the most effective techniques, and it is necessary to further develop the technology using the NOx (Nitrogen Oxide) occluding and reducing catalyst.

For example, Japanese patent laid open publication JP 2006-336518 has disclosed a system using an NOx catalyst for judging the state of deterioration of the NOx catalyst based on a value detected by an oxygen concentration sensor, and for setting and adjusting a period of time for the lean combustion.

When compared with a post-injection system (for injecting fuel some approximate time after the fuel combustion has been completed) and an exhaust-gas pipe fuel adding system (for supplying a predetermined amount of fuel into the exhaust-gas pipe), the above systems for obtaining a fuel-rich condition using the rich combustion has the advantages of being able to supply a high-efficiency reducing agent and of using a lower amount of fuel or less fuel. However, the above system has a disadvantage in that it generates a torque difference between the lean combustion and the rich combustion.

Figure 3A:
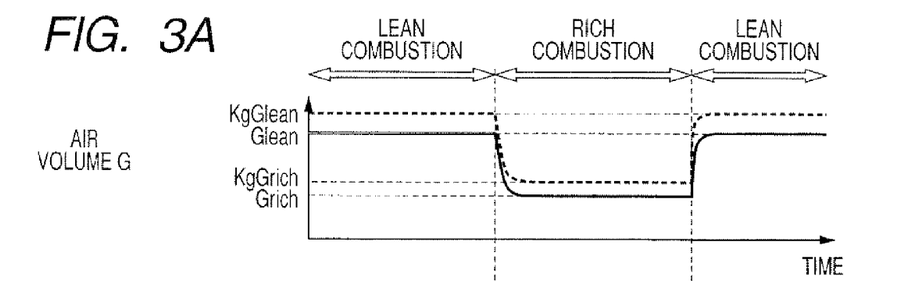
FIG. 3A shows the change of an air volume G during lean combustion and rich combustion in the diesel engine as a conventional example.
Figure 3B:
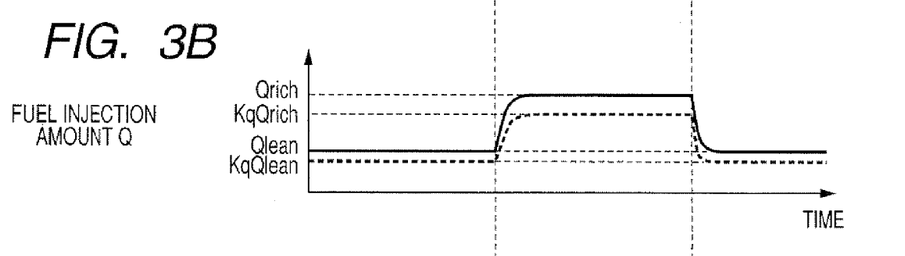
FIG. 3B shows the change of an injection amount Q during the lean combustion and the rich combustion in the diesel engine as the conventional example.
Figure 3C:
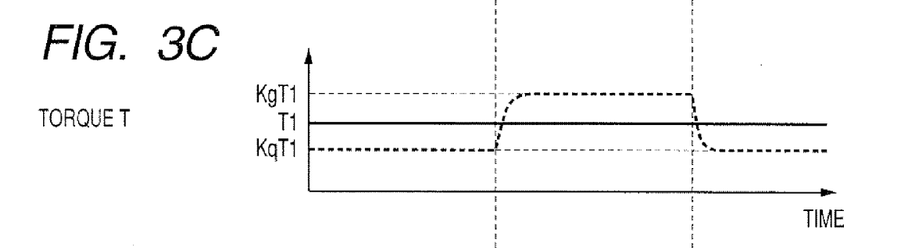
FIG. 3C shows the change of an output torque T during the lean combustion and the rich combustion in the diesel engine as the conventional example.
Figure 3D:
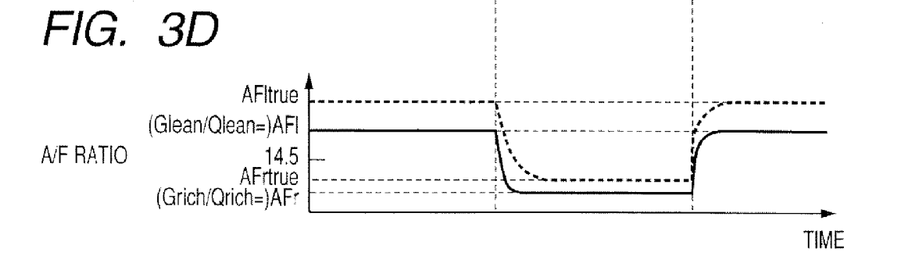
FIG. 3D shows the change of an A/F ratio during the lean combustion and the rich combustion in the diesel engine as the conventional example.

FIG. 3A shows the change of an air volume "G" during the lean combustion and rich combustion in a diesel engine as the conventional example. FIG. 3B shows the change of a fuel injection amount "Q" during the lean combustion and the rich combustion in the diesel engine as the conventional example. FIG. 3C shows the change of a torque "T" during the lean combustion and the rich combustion in the diesel engine as the conventional example. FIG. 3D shows the change of air-fuel "A/F" ratio during the lean combustion and the rich combustion in the diesel engine as the conventional example.

The lateral line in FIG. 3A to FIG. 3D indicates the elapse of time "Time". Each of FIG. 3A to FIG. 3D shows the time zone for the lean combustion, the rich combustion, and the lean combustion, in order, observed from the left side to the right side. The solid line in each figure shows a target value or a theoretical value. The dotted line in each figure designates a detected value or a true value.

In FIG. 3A, the dotted line indicates the detection value detected by an air flow meter, which is shifted from a theoretical air volume. This shifting, namely, the difference between the detected value and the theoretical value is caused by a tolerance or an elapsed deterioration of the air flow meter capable of detecting the air volume.

In FIG. 3B, the dotted line shows the actual fuel injection amount which is shifted from the target injection amount by the tolerance or the elapsed deterioration of the air flow meter.

It will now be explained what the solid line indicates in each of FIG. 3A to FIG. 3D without considering the value indicated by the vertical line.

FIG. 3D shows the change of the A/F ratio value. The A/F ratio value exceeds the value "14.5" during the lean combustion, and on the other hand, becomes lower than the value "14.5" during the rich combustion.

FIG. 3C shows the change of the torque value during the lean combustion and the rich combustion. Because the switching of the lean combustion and the rich combustion does not affect the torque value (such a torque value is requested though the accelerator pedal of the vehicle by the driver), the target value or the torque to be requested which is designated by the solid line has a constant value, which is not changeable.

As described above, it is necessary to change both the A/F value and to keep the constant torque value in the switching process between the lean combustion and the rich combustion.

The air volume G and the injection amount Q designated by the solid lines in FIG. 3A and FIG. 3B are the target air volume and the target injection amount, respectively, which are calculated by an electrical control unit (ECU) in order to have the A/F value in each of the lean combustion and the rich combustion, and to keep the constant torque value shown in FIG. 3C. The ECU controls an intake throttle valve and an EGR valve so that the target air volume becomes equal to the true air volume detected by the air volume detection means. In addition, the ECU calculates the injection period of time according to the fuel pressure and instructs the injectors of the internal combustion engine so that the current injection amount becomes equal to the target injection amount. In theory, it should be able to achieve the constant torque shown in FIG. 3C and the changeable A/F value shown in FIG. 3D by the air volume "G" shown in FIG. 3A and the injection amount "Q" shown in FIG. 3B.

However, it is difficult in actual cases to precisely perform the above theoretical operation. The dotted line shown in FIG. 3A indicates the detected air volume which is shifted from the theoretical or target air volume designated by the solid line.

The dotted line shown in FIG. 3B indicates the actual fuel injection amount which is shifted from the target injection amount designated by the solid line.

The output torque generated by the internal combustion engine is determined by the fuel injection amount during the lean combustion, and is also determined by the air volume during the rich combustion. When the injectors inject the practical amount of fuel as designated by the dotted line shown in FIG. 3A, and the air flow meter detects the practical air volume as designated by the dotted line shown in FIG. 3B, the torque difference between the lean combustion and the rich combustion is generated because the actual torque designated by the dotted line shown in FIG. 3C fluctuates, namely, it becomes difficult to keep the constant torque value through the lean combustion and the rich combustion. So, there is a possibility of decreasing the drivability of the vehicle when this torque difference becomes large, and it is desirable to decrease it as low as possible. No related-art techniques using NOx (Nitrogen Oxide) occluding and reducing catalyst as well as JP 2006-336518 consider such a problem regarding the torque difference between the lean combustion and the rich combustion.

SUMMARY OF THE INVENTION

It is an object of the present invention to provide a control device for an internal combustion engine capable of decreasing an output torque difference between lean combustion and rich combustion of the internal combustion engine.

To achieve the above purposes, the present invention provides a control device for an internal combustion engine having an air-fuel (A/F) ratio sensor, an air volume regulating means, a setting means, a calculation means, and an instruction means. The A/F ratio sensor is configured to detect a ratio between an air volume and a fuel amount during lean combustion and rich combustion of the internal combustion engine. The lean combustion and the rich combustion are switched according to various conditions. The lean combustion provides an excess air volume rather than an air volume in a stoichiometric air-fuel ratio for catalyst control. The rich combustion provides an excess fuel amount rather than a fuel amount in the theoretical air-fuel ratio. The air volume regulating means is configured to regulate a air volume which is an air volume to be supplied to cylinders of the internal combustion engine. The setting means is configured to set a target air volume and a target fuel injection amount which are target values of the air volume and the fuel injection amount to be supplied into the cylinders. The calculation means is configured to calculate a compensation gain value which is a ratio between the target A/F value and the detected A/F value (or ratio) detected by the A/F ratio sensor, wherein the target A/F value set by the setting means is a ratio between the target air volume and the target fuel injection amount. The instruction means is configured to instruct the air volume regulating means to regulate the air volume according to the compensation gain value calculated by the calculation means in order to decrease a torque difference between the lean combustion and the rich combustion.

In the control device for an internal combustion engine according to the present invention, the calculation means calculates the ratio between the target A/F value and the detected A/F value as the compensation gain value, where the target A/F value set by the setting means is the ratio between the target air volume and the target fuel injection amount during the lean combustion. During the rich combustion, the setting means instructs the air volume regulating means to regulate the air volume according to the compensation gain value in order to decrease a torque difference between the lean combustion and the rich combustion. This control can precisely decrease the torque difference between the lean combustion and the rich combustion. Further, the control device according to the present invention can decrease both the torque difference between the lean combustion and the lean combustion and the catalyst control necessary for the internal combustion engine.

The control device as another aspect of the present invention further has an air volume detection means that is configured to detect an air volume to be supplied to the cylinders of the internal combustion engine. In the control device, the instruction means has a target air volume compensation means. The target air volume compensation means is configured to instruct the air volume regulating means so that the air volume detected by the air volume detecting means becomes equal to the air volume after compensation, which is obtained by multiplying the target air volume obtained from the setting means, by the compensation gain value calculated by the calculation means.

The target air volume compensation means instructs the air volume regulating means so that the air volume detected by the air volume detection means approaches and finally equals to the target air volume after compensation, where the target air volume after compensation is obtained by multiplying the target air volume set by the setting means by the compensation gain calculated by the calculation means. This simple calculation can decrease the torque difference between the lean combustion and the rich combustion even if the combustion state of the internal combustion engine is switched from the lean combustion to the rich combustion for the catalyst control.

In the control device as another aspect of the present invention, the calculating means calculates a ratio between the target A/F value and the detected A/F value when the combustion is switched from the lean combustion to the rich combustion, and provides the calculated ratio as the compensation gain value. It is thereby possible to decrease the torque difference using the latest compensation gain when the combustion state is switched from the lean combustion to the rich combustion. This process can be effectively applied to the case of changing the compensation gain according to the elapse of time.

In the control device as another aspect of the present invention, the calculating means calculates a mean value of the ratios, each of which is a ratio between the target A/F value and the detected A/F value during a past period of time before the combustion is currently switched from the lean combustion to the rich combustion, and provides the mean value as the compensation gain value.

Because the calculation means calculates the mean value during the period of time before the combustion state is switched from the lean combustion to the rich combustion, it is possible to suppress the error influence during the compensation gain value calculation and to obtain the compensation gain with high reliability.

Still further, the control device according to the present invention can be applied to various types of the internal combustion engines such as gasoline engines and diesel engines. In particular, although the diesel engine usually operates in the lean combustion, the combustion state of the diesel engine is switched from the lean combustion to the rich combustion in order to perform the catalyst control. This is an important technique to reconcile the decrease in torque difference between the lean combustion and the rich combustion with the catalyst control.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a control device for internal combustion engines such as diesel engines according to the first embodiment of the present invention with reference to FIGS. 1, 2, 4A to 4D, 5, and 7.

Figure 1:
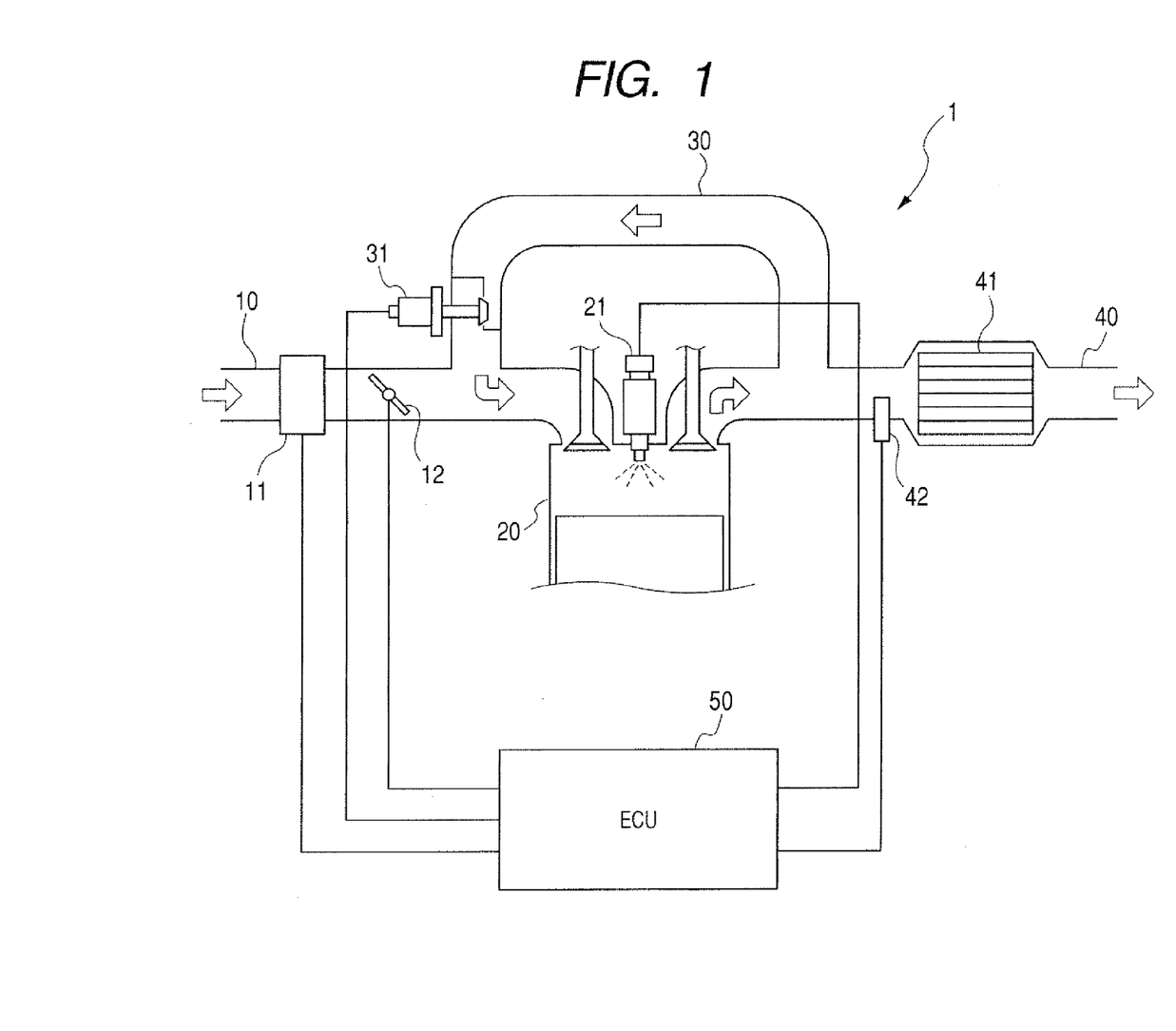
FIG. 1 is a schematic view of a control device comprised of an ECU for a diesel engine as an internal combustion engine according to a first embodiment of the present invention.

FIG. 1 is a schematic view of the control device for a diesel engine as an internal combustion engine according to the first embodiment of the present invention. The control device comprises an electrical control unit (ECU) 50. FIG. 1 mainly shows the diesel engine 1, the air intake system, the exhaust gas system, the exhaust gas reflux system, and the ECU 50. The ECU 50 is a component forming the control device according to the first embodiment capable of performing combustion control of the diesel engine 1.

In the intake system, air is fed into the cylinders 20 of the diesel engine 1 through an air intake passage 10. An airflow meter 11 and an air intake throttle valve 12 (hereinafter, referred to as the "intake throttle valve 12") are mounted to this air intake passage 10. The airflow meter 11 detects the air volume, and then transfers the detection signal to the ECU 50 through an electrical wiring.

The air volume to be fed or supplied into the cylinders is increased and decreased according to the opening degree of the intake throttle valve 12 placed at the downstream side of the airflow meter 11.

An injector 21 is mounted to the corresponding cylinder 20 of the diesel engine 1. The injector 21 injects a specified amount of fuel, which is accumulated in the common rail (not shown), into the corresponding cylinder 20 according to an instruction signal transferred from the ECU 50. The ECU 50 determines the injection timing and the injection fuel amount based on the rotational speed of the diesel engine 1 and other conditions.

NOx occluding and reducing catalyst (NOx catalyst) 41 is mounted to the exhaust gas discharging passage 40 in the exhaust gas system.

This NOx occluding and reducing catalyst (NOx catalyst) 41 occludes NOx contained in the exhaust gas emitted from the diesel engine 1 in lean combustion of a less fuel condition (whose A/F value is not less than 17 in usual diesel engines) in the cylinders 20.

The NOx occluded in the NOx occluding and reducing catalyst (NOx catalyst) 41 is reduced during the rich combustion of a rich fuel condition (whose A/F value is not more than 14.5 in usual diesel engines) in the cylinders 20, and Nitrogen after the reduction is discharged to the outside of the exhaust gas discharging system.

The A/F (air and fuel) ratio sensor 42 is mounted to the exhaust gas discharging passage 40. The A/F (air and fuel) ratio sensor 42 detects an air and fuel ratio of the exhaust gas and transfers the detection signal to the ECU 50.

The exhaust gas reflux system has an EGR (Exhaust Gas Recirculation) passage 30 from the exhaust gas discharging passage 40 to the air intake passage 10. Through the EGR passage 30, the exhaust gas is re-circulated or refluxed into the air intake passage 10.

An EGR valve 31 is mounted to the EGR passage 30. The ECU 50 controls the opening and closing operation of the EGR valve 31 in order to regulate the exhaust-gas recirculation or refluxed amount.

Figure 2:
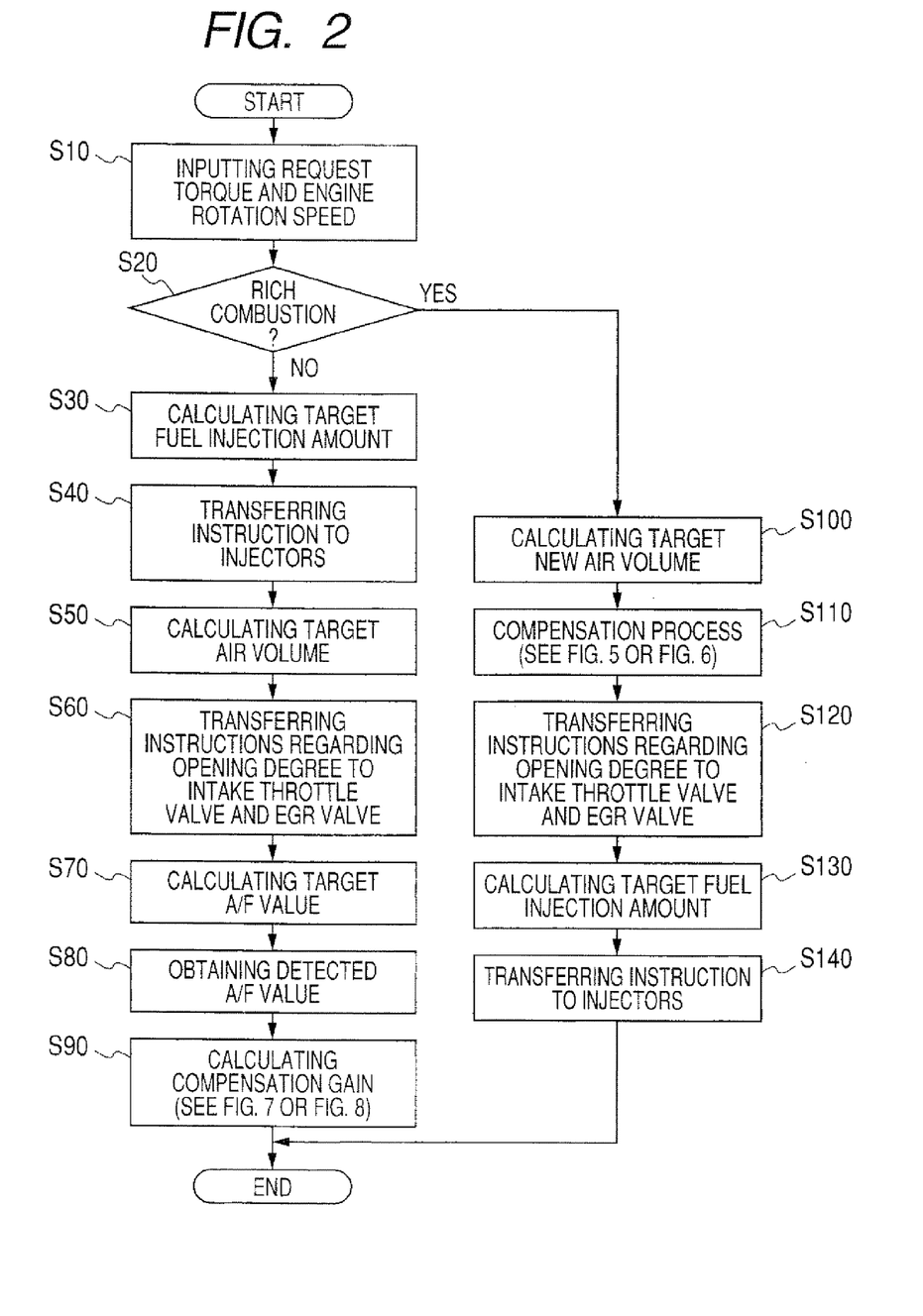
FIG. 2 is a flow chart of an entire control process performed by the control device according to the first embodiment shown in FIG. 1.

FIG. 2 is the flow chart showing the entire control operation of the ECU 50 that forms the control device according to the first embodiment shown in FIG. 1.

As shown in FIG. 2, the ECU 50 calculates a compensation gain value which is a ratio between a target A/F value and a detected A/F value during the lean combustion, and then compensates the air volume using the compensation gain value during the rich combustion. This process can decrease a torque difference between the lean combustion and the rich combustion. A description will now be given of those processes in detail.

First, at step S10, the ECU 50 inputs a request torque and an engine rotational speed. The ECU 50 determines both the request torque and engine rotational speed based on the driver's accelerator pedal opening ratio.

At step S20, the ECU 50 selects either the rich combustion or the lean combustion. In general, the lean combustion in diesel engines supplies an excess volume of the air into the cylinders 20, and the rich combustion in diesel engine performs catalyst control.

The lean combustion usually takes the A/F value of not less than 17. In the lean combustion, NOx contained in the exhaust gas is occluded in the NOx catalyst 41. The ECU 50 periodically and temporarily switches the combustion state from the lean combustion to the rich combustion. The rich combustion provides an excess fuel amount into the cylinders. The cycle of such a switching operation is changeable, namely, not constant.

In the rich combustion, the A/F value is usually not more than 14.5, and NOx occluded in the NOx catalyst 41 is reduced to Nitrogen by chemical reaction between HC (Hydro Carbon) and CO, and the like contained in the exhaust gas, and then discharged to the outside of the exhaust gas passage.

The ECU 50 estimates the ratio of the NOx occluded in the NOx catalyst 41 based on a past combustion history obtained by a catalyst manager (not shown), and then switches the combustion state from the lean combustion to the rich combustion when it is judged that an adequate amount of NOx is occluded in the NOx catalyst 41 based on the estimation result.

In the lean combustion, there is a characteristic of determining the torque value based on a fuel injection amount. On the other hand, in the rich combustion, there is a characteristic of determining the torque value based on an air volume.

As described below, the fuel injection amount (or injection amount) of the injector 21 is firstly determined during the lean combustion according to a predetermined map indicating a relationship between the request torque and the fuel injection amount. The air volume is determined so that the components contained in an exhaust gas are controlled according to the determined injection amount.

On the other hand, in the rich combustion, the air volume is determined using a predetermined map. This map is made in advance and indicates a relationship between the request torque and the air volume. The fuel injection amount is then determined in order to make the rich combustion according to the request torque.

The above process can produce the same amount of torque between the lean combustion and the rich combustion.

Returning to the flowchart shown in FIG. 2, when the rich combustion is selected ("Yes") at step S20, the operation flow goes to step S100.

On the other hand, when the lean combustion is selected ("No") at step S20, the operation flow progresses to step S30. On selecting the lean combustion ("No") at step S20, the target injection amount in the lean combustion is determined at step S30 based on the request torque which is determined by the driver's accelerator pedal opening ratio prescribed above.

The ECU 50 transfers to the injectors 21 the instruction signal which indicates the target injection amount (step S40). The injectors 21 receive the instruction signal indicating the target injection amount, and then inject the specified amount of fuel into the corresponding cylinders of the diesel engine according to the instruction signal received. Hereinafter, the target injection amount in the lean combustion will be represented with "Qlean".

The operation flow progresses to step S50. In step S50, the target air volume during the lean combustion is so determined that the condition of the exhaust gas is controlled according to the target injection amount Qlean determined at step S30. Hereinafter, the target air volume in the lean combustion will be represented with "Glean".

Because the control device for the internal combustion engine shown in FIG. 1 comprises the air intake passage 10 and the EGR passage 30, the air volume which is the air volume to be supplied into the cylinders 20 is determined by the opening ratio between the intake throttle valve placed on the intake passage 10 and the EGR valve 31 placed on the EGR passage 30, where the outside air is supplied into the diesel engine 1 through the air intake passage 10, and the exhaust gas is refluxed into the diesel engine 1 through the EGR passage 30.

The ECU 50 determines the opening degree of the intake throttle valve 12 and the opening degree of the EGR valve 31 so that the value of the air flow meter 11 becomes equal to the target air volume Glean. The ECU 50 transfers the determined values regarding the opening degree to the intake throttle valve 12 and the EGR valve 31. It is possible to determine the opening degree of the intake throttle valve 12 and the opening degree of the EGR valve 31 using a map which is made and stored in advance into the memory (omitted from drawings) in the ECU 50, for example.

At step S60, the ECU 50 determines the opening degree of the air intake throttle valve 12 and the opening degree of the EGR valve 31 so that the detected value of the air flow meter 11 becomes equal to the target air volume Glean, and instructs the air intake throttle valve 12 and the opening degree of the EGR valve 31 to open according to the determined opening degrees. It is preferred to determine the opening degree of each of the air intake throttle valve 12 and the opening degree of the EGR valve 31 based on the map which is stored in the memory in advance.

In the usual process at step S60, the ECU 50 firstly determines a reference opening degree of the intake throttle valve 12 and a reference opening degree of the EGR valve 31 based on the map, and transfers instructions regarding those reference opening degrees to the air intake throttle valve 12 and the EGR valve 31. In step S60, the air flow meter 11 further detects the actual air volume (or referred to as the "detected air volume"), and the ECU 50 then instructs one or both of the air intake throttle valve 12 and the EGR valve 31 to regulate those opening degrees so that the detected actual air volume approaches and finally reaches the target air volume Glean.

The operation flow then progresses to step S70. At step S70, the target A/F value AFI is determined. The target A/F value is calculated by the following equation (1) using the target injection amount Qlean obtained at step S30 and the target air volume Glean obtained at step S50:

$$AFI = Glean/Qlean \quad (1).$$

The operation flow then progresses to step S80. At step S80, the A/F sensor 42 placed on the exhaust gas passage 40 detects a detected A/F ratio, and transfers the detected A/F ratio AFItrue to the ECU 50.

Figure 7:
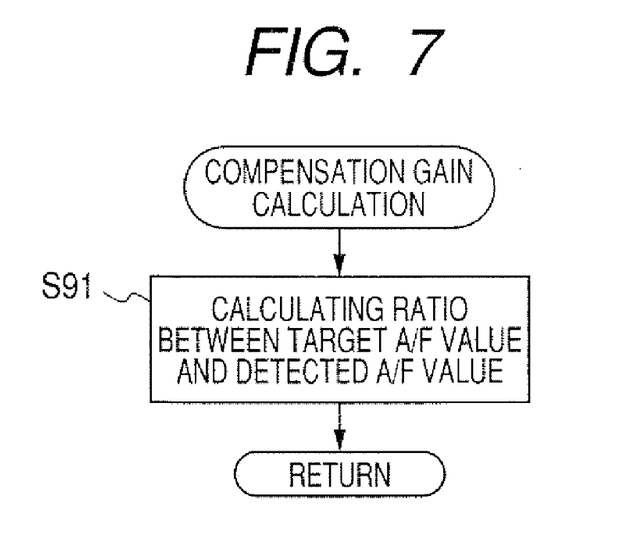
FIG. 7 is a flow chart of a compensation-gain calculation process performed by the control device according to the first embodiment of the present invention.

At step S90, the ECU 50 calculates a compensation gain. FIG. 7 is a flow chart of such a compensation-gain calculation process performed by the control device according to the first embodiment. FIG. 7 shows the actual calculation process for obtaining the compensation gain value. Hereinafter, the compensation gain value will be referred to as the "compensation gain Kaf". The compensation-gain calculation process at step S90 shown in FIG. 2 is performed by step S91 shown in FIG. 7.

As shown in FIG. 7, at step S91, the ECU 50 calculates a ratio between the target A/F value obtained at step S70 and the detected A/F ratio AFItrue obtained at step S80, and uses the calculated value as the compensation gain Kaf. That is, the compensation gain Kaf can be calculated by the following equation (2):

$$Kaf = AFI/AFItrue \quad (2).$$

The reason why the compensation gain Kaf as the ratio between AFI and AFItrue (AFI/AFItrue) is calculated is as follows.

In general, the target A/F value AFI does not equal the detected A/F ratio AFItrue. The presence of detection error of the air flow meter 11 and the error of each injector 21 causes such a difference between AFI and AFItrue.

The inventor of the present invention has a view that there is a linear relationship between the detected air volume detected by the air flow meter and the true air volume. In other words, when the detected air volume detected by the air flow meter is Glean, the true air volume becomes in general KgGlean, where Kg is a constant value. In general, each air flow meter has a different constant value Kg.

Further, the inventor according to the present invention has another view that there is a linear relationship between the target fuel injection amount to be instructed to the injectors and the true fuel injection amount as the actual fuel injection amount. That is, when the instruction value of the fuel injection amount for each injector is Glean, the true fuel injection amount becomes KqQlean, where KQ is a constant value of the injector. In general, each injector has a different constant value KQ. Hereinafter, Kg and Kq are referred to as the "error gain".

The detected A/F ratio AFItrue can be calculated using the true air volume and the true fuel injection amount by the following equation (3):

$$AFItrue = KgGlean/KqQlean \qquad (3).$$

The following equation (4) can be obtained using the equation (1) and the equation (2):

$$AFI/AFItrue = Kq/Kg \qquad (4).$$

The equation (4) shows that the ratio between the target A/F ratio AFI and the detected A/F ratio AFItrue is equal to the ratio between the error gains Kq and Kg. The following equation (5) is obtained using the equations (2) and (4):

$$Kaf = Kq/Kg \qquad (5).$$

The value Kaf can be obtained by the equation (2) using the detected A/F value AFItrue and the target A/F value AFI.

The equation (5) also indicates that the Kaf is the ratio between Kq and Kg. That is, it is possible to determine the ratio Kaf=Kg/Kq even if the error gains Kg and Kq are unknown.

The compensation gain Kaf is calculated at step S90 shown in FIG. 2 by the above calculation steps. In the first embodiment, during the rich combustion, the target air volume is compensated using the compensation gain Kaf.

Returning to the flow chart shown in FIG. 2, when the rich combustion is selected at step S20 ("Yes"), the operation flow goes to step S100.

In step S100, a target air volume Grich for the rich combustion is calculated. The target air volume Grich in the rich combustion is determined using the request torque and the engine rotational speed.

Next, the compensation is performed at step S110 in order to decrease the torque difference between the lean combustion and the rich combustion.

Figure 5:
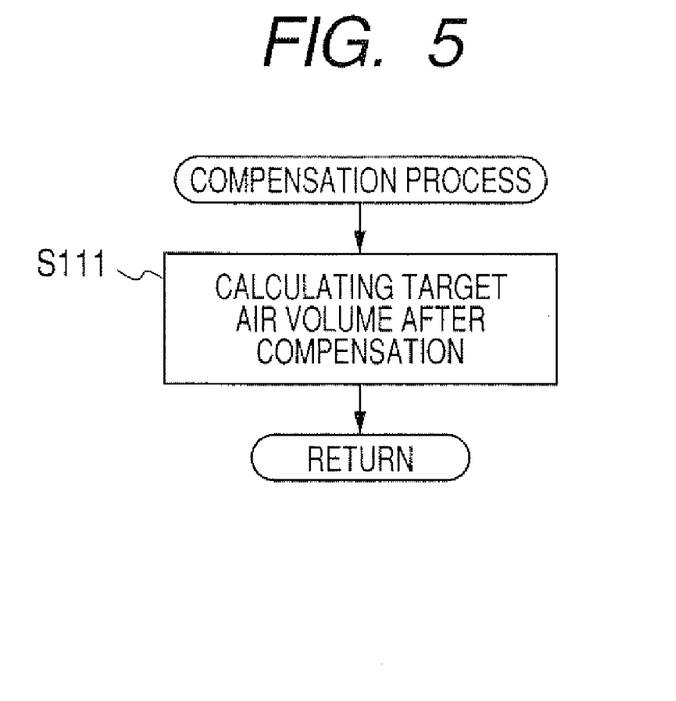
FIG. 5 is a flow chart of a compensation process performed by the control device according to the first embodiment of the present invention.

FIG. 5 shows the compensation process performed by the control device including the ECU 50 according to the first embodiment of the present invention. The compensation process at step S110 shown in FIG. 2 is performed by step S111 shown in FIG. 5. That is, the process shown in FIG. 5 corresponds to the compensation process at step S110 shown in FIG. 2.

At step S111 in FIG. 5, the target air volume Grich is compensated by the following procedure.

When the target air volume after compensation is expressed with Gmod, the target air volume Gmod after compensation is determined by the following equation (6) using the value Kaf prescribed above:

$$Gmod = KafGrich \qquad (6).$$

That is, the target air volume Grich before compensation is multiplied by Kaf.

The reason why the compensation value Gmod can decrease the torque difference between the lean combustion and the rich combustion will be explained later.

The operation flow moves from step S110 to step S120 shown in FIG. 2. In step S120, the ECU 50 instructs the intake throttle valve 12 and the EGR valve 31 to regulate those opening degrees so that the target air volume Gmod after compensation determined at step S110 shown in FIG. 2 (namely, at step S111 shown in FIG. 5) approaches the value detected by the air flow meter 11. The process at step S120 can be performed by following several steps.

(a) Similar to the process at step S60, the reference value is determined using the map; and (b) The fine control is performed after step (a).

The operation flow then progresses to step S130. At step S130, the ECU 50 calculates the target injection amount Qrich in order to perform the rich combustion. It is acceptable to determine the target injection amount Qrich according to the target air volume Gmod after compensation has been determined at step S110.

The operation flow progresses to step S140. At step S140, the ECU 50 transfers the instruction regarding the target injection amount Qrich determined at step S130 to the injectors 21. The injectors 21 inject the specified amount of fuel into the corresponding cylinders based on the above instruction. In the actual case at step S140, the ECU 50 instructs the injectors to inject the specified amount of fuel according to the instruction value, and the A/F sensor 42 detects the actual A/F value. When the detection result indicates that the combustion state does not fall in the rich combustion, it is acceptable for the injectors 21 to continue the fuel injection into the corresponding cylinders.

After completion of step S90 or step S140, the operation of the flow chart shown in FIG. 2 is completed.

The operation of the flow chart shown in FIG. 2 is repeatedly executed at a regular interval of time.

A description will now be given of the effect of the compensation step S110 using the equation (6) in order to decrease the torque difference between the lean combustion and the rich combustion.

First of all, a conventional control method of the air volume G, the injection amount Q, the torque T, and the A/F ratio will be explained with reference to FIG. 3A to 3D.

FIG. 3A shows the change of the air volume G during lean combustion and rich combustion in the diesel engine as a conventional example. FIG. 3B shows the change of the injection amount Q during the lean combustion and the rich combustion in the diesel engine as the conventional example. FIG. 3C shows the change of the output torque T during the lean combustion and the rich combustion in the diesel engine as the conventional example. FIG. 3D shows the change of the A/F ratio during the lean combustion and the rich combustion in the diesel engine as the conventional example.

In the air volume shown in FIG. 3A, as prescribed above, the target air volume or its theoretical value becomes Glean during the lean combustion. On the other hand, the true value becomes KgGlean which is obtained by multiplying Glean by the constant value Kg.

The target air volume during the rich combustion is Grich. Because the air flow meter 11 approximately has the same error characteristic in the rich combustion and the lean combustion, the true value of the air volume during the rich combustion becomes KgGrich, which is obtained by multiplying Frich by the constant value Kg, like the lean combustion. Although the constant value "Kg" is more than 1 and the constant value "Kq" is smaller than 1 in the conventional case shown in FIG. 3A to 3D, it is possible in the present invention that Kg is smaller than 1 or Kq is larger than 1.

Next, in the injection amount shown in FIG. 3B, the target injection amount or the theoretical injection amount during the lean combustion becomes Qlean. On the other hand, the true value of the fuel injection amount becomes KqQlean during the lean combustion.

The target injection amount during the rich combustion becomes Qrich. Because the injector 21 approximately has the same error characteristic during the rich combustion and the lean combustion, the true value of the injection amount during the rich combustion becomes KqQrich. Although the first embodiment shows the condition of Kg>1 and Kq<1, the scope of the present invention is not limited by this condition, it is acceptable to have the condition of Kg<1 or Kq>1.

A description will now be given of the torque value shown in FIG. 3C.

The theoretical torque value is expressed by T1. During the lean combustion, as prescribed above, there is a characteristic in which the torque value is proportional to the fuel injection amount. As shown in FIG. 3B, the true injection amount becomes KqQlean which is obtained by multiplexing the theoretical value Qlean by the constant value Kq. Accordingly, the real torque value becomes KqT1 which is obtained by multiplexing the theoretical value T1 by the constant value Kq.

In the rich combustion, as prescribed above, there is a characteristic in which the torque value is in proportional to the air volume.

As shown in FIG. 3A, the true value of the air volume is Kg times of the theoretical value. The true torque value becomes KgT1 during the rich combustion. In a usual case in which Kg is different from Kq, as shown in FIG. 3C, the torque difference occurs between the lean combustion and the rich combustion.

Next, a description will now be given of the A/F value shown in FIG. 3D. In the lean combustion, the target A/F value is AFl. As prescribed above, the target value AFl becomes equal to Glean/Qlean, as expressed by the equation (1). The detected A/F ratio is AFltrue.

On the other hand, during the rich combustion, the target A/F value and the detected A/F value are expressed by AFr and AFrtrue.

Like the same reason of the lean combustion, AFr is equal to Grich/Qrich. FIG. 3D shows this relationship.

Next, a description will now be given of the compensation effect of the target air volume with reference to FIG. 4A to FIG. 4D.

Figure 4A:
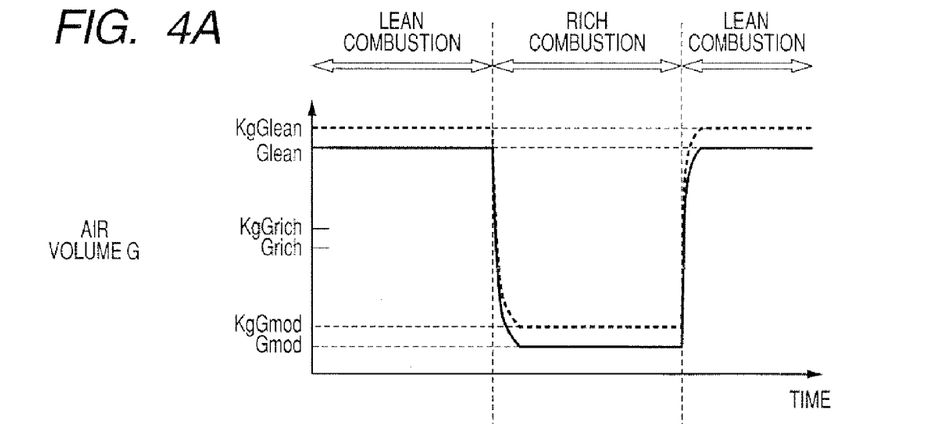
FIG. 4A shows the change of an air volume G during lean combustion and rich combustion in a diesel engine as an internal combustion engine according to the first embodiment of the present invention.
Figure 4B:
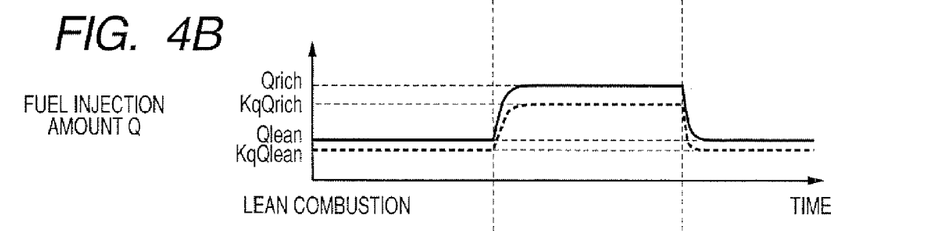
FIG. 4B shows the change of an injection amount Q during the lean combustion and the rich combustion in the diesel engine according to the first embodiment of the present invention.
Figure 4C:
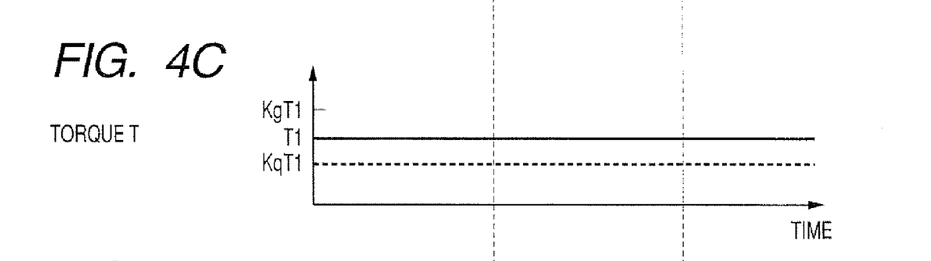
FIG. 4C shows the change of an output torque T during the lean combustion and the rich combustion in the diesel engine according to the first embodiment of the present invention.
Figure 4D:
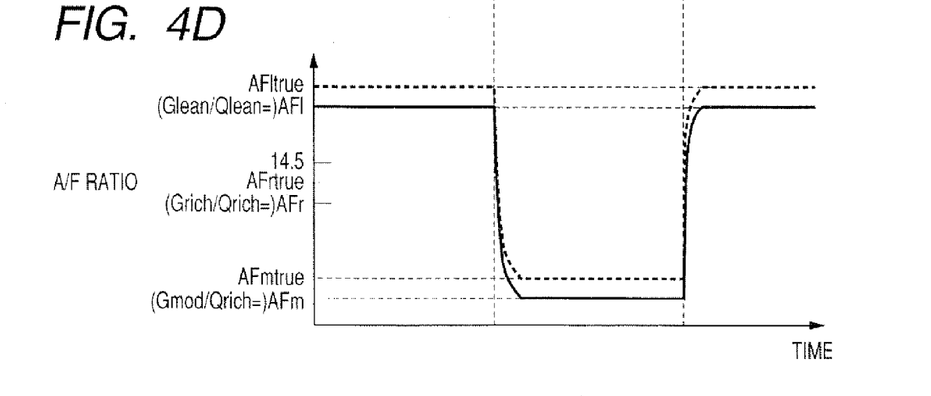
FIG. 4D shows the change of an A/F ratio during the lean combustion and the rich combustion in the diesel engine according to the first embodiment of the present invention.

FIG. 4A shows the change of the air volume during lean combustion and rich combustion in the diesel engine according to the first embodiment of the present invention. FIG. 4B shows the change of the injection amount during the lean combustion and the rich combustion in the diesel engine according to the first embodiment. FIG. 4C shows the change of the output torque during the lean combustion and the rich combustion in the diesel engine according to the first embodiment. FIG. 4D shows the change of the air-fuel ratio (A/F ratio) during the lean combustion and the rich combustion in the diesel engine according to the first embodiment.

During the rich combustion, the air volume is compensated according to the equation (6). In FIG. 4A, the solid line and the dotted line indicate the target air volume and the true air volume, respectively, after compensation. As shown in the vertical line, the target air volume after compensation is Gmod. This Gmod can be obtained by the equation (6).

As prescribed above, because the true air volume during the rich combustion is Kg times of its target air volume or the detected air volume detected by the air flow meter, the true air volume after compensation becomes KgGmod designated in the vertical line of FIG. 4D.

The following equation (7) can be obtained using the equations (5) and (6):

$$KgGmod = KqGrich \qquad (7).$$

The equation (7) clearly indicates that the true air volume after compensation is equal to KqGrich.

Next, FIG. 4B shows the fuel injection amount. FIG. 3B and FIG. 4B show the same fuel injection amount.

FIG. 4C shows the torque value. As prescribed above, there is a remarkable regularity in which the true torque value is in proportion with the air volume. As shown in FIG. 3A to FIG. 3D, the true air volume before compensation is KgGrich and the true torque value is KgT1 before compensation in the rich combustion. After compensation, the true air volume becomes KqGrich. According to the above facts, the true torque value after compensation becomes KqT1. The dotted line shown in FIG. 4D shows this true torque value KqT1 after compensation.

The true torque value during the lean combustion becomes KqT1, as shown in FIG. 3C. As clearly shown by the dotted line in FIG. 4C, the true torque value during both the lean combustion and the rich combustion becomes the same value KqT1, and as a result, there is no torque difference between the lean combustion and the rich combustion. This is the effect of the target air volume compensation using the equation (6).

As shown in FIG. 4D, the A/F ratio during the rich combustion is changed by the above compensation. In FIGS. 4A to 4D, the target A/F ratio and the true A/F ratio are represented with AFm and AFmtrue, respectively. The target A/F ratio AFm is equal to the value of Gmod/ Qrich.

Second Embodiment

A description will be given of a second embodiment of the present invention with reference to FIG. 6.

Figure 6:
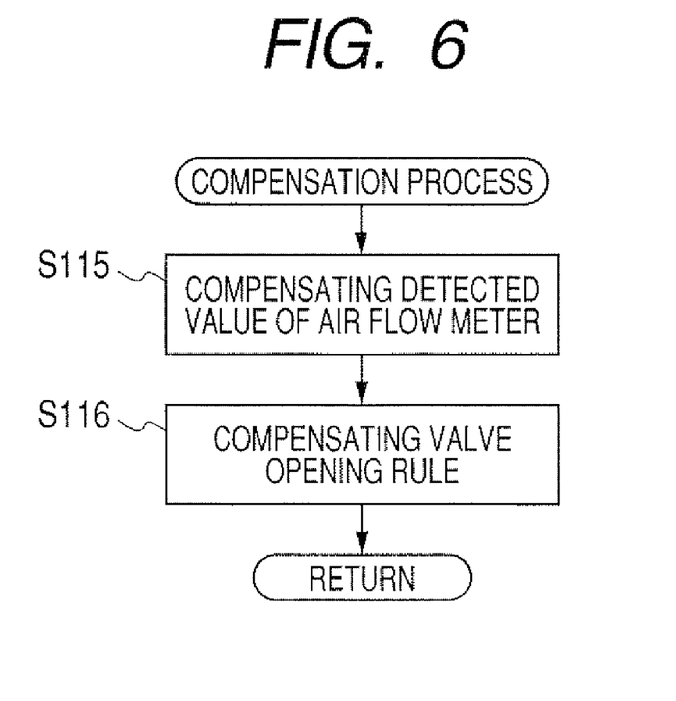
FIG. 6 is a flow chart of another compensation process performed by the control device according to a second embodiment of the present invention.

FIG. 6 is a flow chart of a compensation process performed by the control device for the diesel engine as the internal combustion engine according to the second embodiment.

The second embodiment uses the compensation process shown in FIG. 6 instead of the compensation process shown in FIG. 5. The compensation process at step S110 shown in FIG. 2 is performed by step S115 and step S116 shown in FIG. 6, instead of step 111 shown in FIG. 5.

Because the processes other than the compensation process shown in FIG. 6 in the second embodiment are equal to those of the first embodiment, the explanation of other processes is accordingly omitted here.

In the compensation process shown in FIG. 6, the detection value detected by the air flow meter 11 is compensated at step S115.

That is, at step S115, the detection value of the air flow meter 11 is multiplied by 1/Kaf, where Kaf is the compensation gain prescribed above.

At step S116, the valve opening ratio is compensated. As prescribed above, the ECU 50 controls the opening ratio between the intake throttle valve 12 and the EGR valve 31 so that the detected air volume which is changed becomes equal to the target air volume.

The execution of those processes at step S115 and S116 has the same effect of multiplying the target air volume by the compensation gain Kaf. Therefore the second embodiment of the present invention can decrease the torque difference between the lean combustion and the rich combustion, like the effect of the first embodiment.

Third Embodiment

A description will now be given of a third embodiment of the present invention with reference to FIG. 8.

Figure 8:
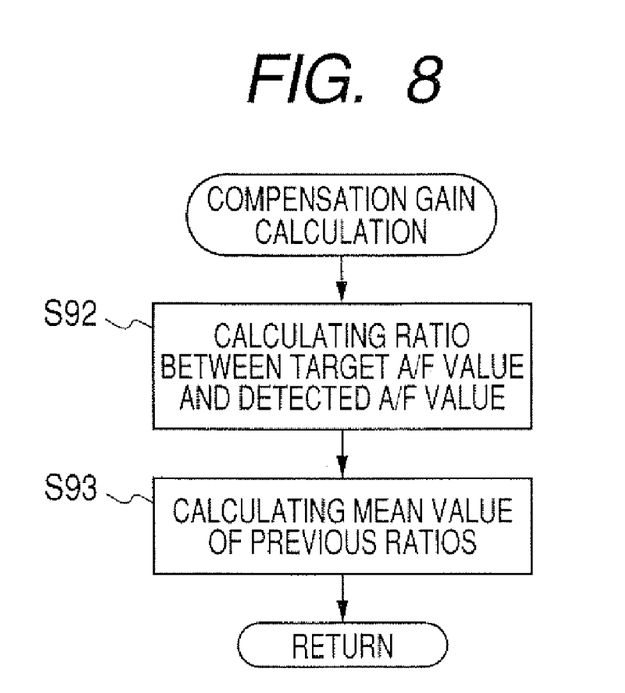
FIG. 8 is a flow chart of another compensation-gain calculation process performed by the control device according to a third embodiment of the present invention.

FIG. 8 is a flow chart of a compensation-gain calculation process performed by the control device according to the third embodiment of the present invention.

In the third embodiment, the compensation-gain calculation process at step S90 shown in FIG. 2 is performed by step S92 and S93 shown in FIG. 8 instead of performing step S91 shown in FIG. 7.

At step S92 shown in FIG. 8, the ECU 50 calculates the ratio between the target A/F value AFI and the detected A/F value AFItrue. The operation flow progresses to step S93.

At step S93, the ECU 50 firstly stores the ratio calculated at step S92 into the memory means (not shown). At step S93, the ECU 50 then reads out the past ratios (each is the ratio between the target A/F value AFI and the detected A/F value AFItrue in the past period of time) stored in the memory means. The ECU 50 then calculates a mean value of those past ratios.

The ECU 50 uses this mean value as the compensation-gain value Kaf. It is possible that the lean combustion period including the process at step S92 is used as the above calculation period of time. It is also possible to use an optional period of time for calculating such a ratio.

It is also possible that the optional period of time for calculating such a ratio includes the rich combustion period. According to the present invention, the compensation-gain value Kaf is the ratio between the target A/F value AFI and the detected A/F value AFItrue at an optional time at step S91 in the first embodiment.

On the other hand, at step S92 and step S93 shown in FIG. 8 in the third embodiment, the compensation-gain value Kaf is the mean value of the past ratios of the target A/F value AFI and the detected A/F value AFItrue.

The first embodiment uses as the compensation-gain value the ratio between the target A/F value AFI and the detected A/F value AFItrue at the shifting time to the rich combustion. This has the advantage of obtaining the compensate-gain Kaf using the latest information. This advantage can be adapted so that the error-gain can be changed according to the time of period.

On the other hand, because the third embodiment uses the mean value of the past ratios, when the error of the ratio between the target A/F value AFI and the detected A/F value AFItrue becomes large and the error would cause a large disadvantage, the use of the mean value can eliminate the disadvantage and decrease the influence of the disadvantage.

(Modifications)

In another modification according to the present invention, it is possible to perform both the compensation process shown in FIG. 6 and the compensation-gain calculation process shown in FIG. 8.

It is possible to use a diesel particulate filter instead of the NOx catalyst 41 shown in FIG. 1. In this case, because the rich combustion can make an oxygen deficiency condition, the rich combustion has an advantage to suppress abnormally increasing the temperature of the diesel particulate filter, which is caused by burning soot in the diesel particulate filter, by making the oxygen deficiency state.

The processes at step S70, S80, and S90 act as calculation means. The processes at step S110 and S120 act as an instruction means and a target air volume compensation instruction means. The intake throttle valve 12 and the EGR valve 31 form the air volume regulating means. ECU 50 forms a setting means.

As another modification according to the present invention, it is possible to calculate the target A/F value based on the detected air volume and the target injection amount instead of calculating it using the target air volume and the target injection amount. It is the reason why that although the intake throttle valve and the EGR valve are so controlled that the detected air volume approaches and finally equals to the target air volume, there is a possibility that a response delay causes a difference between those volumes and the detected air volume cannot be thereby equal to the target air volume. This can be avoided using the target A/F value which is calculated based on the detected air volume and the target injection amount.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A control device for an internal combustion engine comprising:
    an air-fuel (A/F) ratio sensor configured to detect a ratio between an air volume and a fuel amount during the lean combustion and the rich combustion of the internal combustion engine which are switched, where the lean combustion provides an excess air volume rather than an air volume in a stoichiometric air-fuel ratio for catalyst control, and the rich combustion provides an excess fuel amount rather than an fuel amount in the stoichiometric air-fuel ratio;
    air volume regulating means configured to regulate an air volume which is an air volume to be supplied to cylinders of the internal combustion engine;
    setting means configured to set a target air volume and a target fuel injection amount which are target values of the air volume and the fuel injection amount to be supplied into the cylinders;
    calculation means configured to calculate a compensation gain value which is a ratio between the target A/F value and the detected A/F value detected by the A/F ratio sensor, wherein the target A/F value, set by the setting means, is a ratio between the target air volume and the target fuel injection amount; and
    instruction means configured to instruct the air volume regulating means to regulate the air volume according to the compensation gain value calculated by the calculation means in order to decrease a torque difference between the lean combustion and the rich combustion.

2. The control device according to claim 1, wherein the internal combustion engine is a diesel engine.

3. The control device according to claim 1, wherein the air volume adjusting means comprises an air intake throttle valve and an EGR valve.

4. The control device for an internal combustion engine according to claim 1, the calculating means calculates a ratio between the target A/F value and the detected A/F value when the combustion is switched from the lean combustion to the rich combustion, and provides this ratio as the compensation gain value.

5. The control device according to claim 4, wherein the internal combustion engine is a diesel engine.

6. The control device for an internal combustion engine according to claim 1, further comprising air volume detection means configured to detect an air volume to be supplied to the cylinders of the internal combustion engine, wherein
the instruction means comprises target air volume compensation means configured to instruct the air volume regulating means so that the detected air volume detected by the air volume detecting means becomes equal to the air volume after compensation which is obtained by multiplying the target air volume transferred form the setting means by the compensation gain value calculated by the calculation means.

7. The control device for an internal combustion engine according to claim 6, the calculating means calculates a ratio between the target A/F value and the detected A/F value when the combustion is switched from the lean combustion to the rich combustion, and provides this ratio as the compensation gain value.

8. The control device for an internal combustion engine according to claim 6, the calculating means calculates a mean value of the ratios between the target A/F value and the detected A/F value during previous periods of time before the combustion is switched from the lean combustion to the rich combustion, and provides the mean value as the compensation gain value.

9. The control device according to claim 6, wherein the internal combustion engine is a diesel engine.

10. The control device for an internal combustion engine according to claim 1, the calculating means calculates a mean value of the ratios between the target A/F value and the detected A/F value during previous periods of time before the combustion is switched from the lean combustion to the rich combustion, and provides the mean value as the compensation gain value.

11. The control device according to claim 10, wherein the previous periods of time includes one or both the periods of time for the lean combustion and the rich combustion.

12. The control device according to claim 10, wherein the previous periods of time includes one or both the periods of time for the lean combustion and the rich combustion.

13. The control device according to claim 10, wherein the internal combustion engine is a diesel engine.

* * * * *